(12) United States Patent
Williamson

(10) Patent No.: US 12,330,544 B2
(45) Date of Patent: *Jun. 17, 2025

(54) TRAILER SYSTEM AND METHODS OF USE

(71) Applicant: Richard Leslie Williamson, Ocala, FL (US)

(72) Inventor: Richard Leslie Williamson, Ocala, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/933,664

(22) Filed: Oct. 31, 2024

(65) Prior Publication Data

US 2025/0050796 A1    Feb. 13, 2025

Related U.S. Application Data

(63) Continuation of application No. 18/358,205, filed on Jul. 25, 2023, now Pat. No. 12,157,408.

(51) Int. Cl.
*B60P 1/02*      (2006.01)
*B60G 5/06*      (2006.01)

(52) U.S. Cl.
CPC .............. *B60P 1/027* (2013.01); *B60G 5/06* (2013.01)

(58) Field of Classification Search
CPC .......... B60P 1/025; B60P 1/027; B62D 63/08; B62D 53/062
See application file for complete search history.

(56) References Cited

U.S. PATENT DOCUMENTS

| | | | | |
|---|---|---|---|---|
| 4,077,642 | A | * | 3/1978 | Clark .................. B60P 1/025 280/43.23 |
| 4,637,770 | A | * | 1/1987 | Swadell ................ B60P 3/1033 254/10 R |
| 4,673,328 | A | * | 6/1987 | Shiels .................. B60P 1/025 414/559 |
| 5,536,131 | A | * | 7/1996 | Behr .................... B60P 1/025 296/25 |
| 5,630,693 | A | * | 5/1997 | Sobina .................. B60P 1/025 414/495 |
| 5,810,544 | A | * | 9/1998 | Wellman ................ B60P 1/025 280/124.128 |
| 6,113,130 | A | * | 9/2000 | Saulce ................ B62D 63/061 280/43.11 |

(Continued)

FOREIGN PATENT DOCUMENTS

| | | | |
|---|---|---|---|
| AU | 2019203296 A1 | 1/2020 | |
| FR | 3053308 A1 * | 1/2018 | .............. B60P 1/025 |
| GB | 2476530 A * | 6/2011 | ................. B60P 1/02 |

OTHER PUBLICATIONS

Office Action dated Oct. 4, 2023 in U.S. Appl. No. 18/358,205.

(Continued)

*Primary Examiner* — Katy M Ebner
(74) *Attorney, Agent, or Firm* — SALIWANCHIK, LLOYD & EISENSCHENK

(57) ABSTRACT

A trailer system and method of use for towing a load are provided. The trailer system include a trailer body supported by suspension arms on a trailer frame. A hoist mechanism having a winch device and a flexible connector can raise and lower the trailer body by swinging on the suspension arms, which maintain the trailer body in a substantially horizontal orientation during the swing. A modular wheel suspension can be attached to the trailer system.

16 Claims, 6 Drawing Sheets

(56) References Cited

U.S. PATENT DOCUMENTS

| | | | | |
|---|---|---|---|---|
| 6,273,435 B1* | 8/2001 | Stringer | ............... | B62D 53/062 |
| | | | | 280/789 |
| 7,044,704 B1* | 5/2006 | Roose | ................... | B60P 1/025 |
| | | | | 280/43.23 |
| 7,223,057 B2* | 5/2007 | Bellis, Jr. | ............... | B60P 3/122 |
| | | | | 414/373 |
| 7,322,627 B1* | 1/2008 | Nicholson | ............... | B60P 1/025 |
| | | | | 296/25 |
| 8,322,966 B2* | 12/2012 | Doskocil | ................ | B60P 1/025 |
| | | | | 414/498 |
| 8,668,426 B1* | 3/2014 | Baron | .................... | B60P 1/025 |
| | | | | 414/458 |
| 8,727,360 B2* | 5/2014 | Catford | .................. | B60P 1/027 |
| | | | | 280/43.18 |
| 9,403,559 B1* | 8/2016 | Hadley | .................... | B60P 3/00 |
| 9,725,024 B1* | 8/2017 | Davis | .................. | B62D 63/061 |
| 11,351,903 B1* | 6/2022 | Williamson | ............ | B60P 1/027 |
| 2005/0280272 A1* | 12/2005 | Vokey | .................... | B60P 1/025 |
| | | | | 296/25 |
| 2012/0181760 A1* | 7/2012 | Catford | .................. | B60P 1/027 |
| | | | | 280/43.18 |
| 2021/0276636 A1* | 9/2021 | Griffee | ................. | B60P 1/4492 |

OTHER PUBLICATIONS

Office Action dated Dec. 4, 2023 in U.S. Appl. No. 18/358,205.
Office Action dated Feb. 13, 2024 in U.S. Appl. No. 18/358,205.
Notice of Allowance dated Jul. 17, 2024 in U.S. Appl. No. 18/358,205.

* cited by examiner

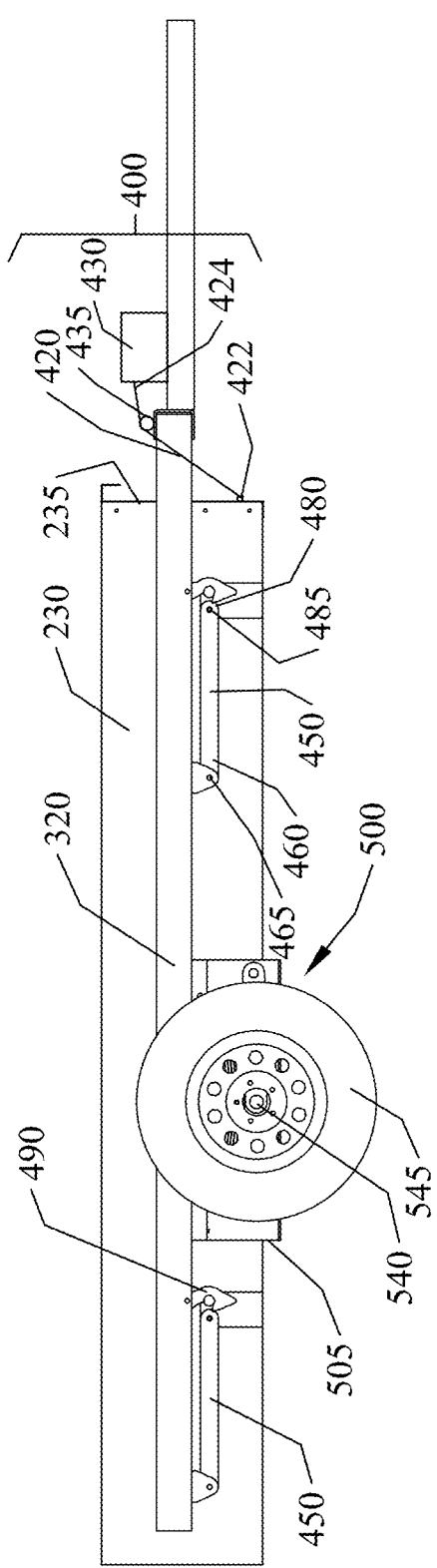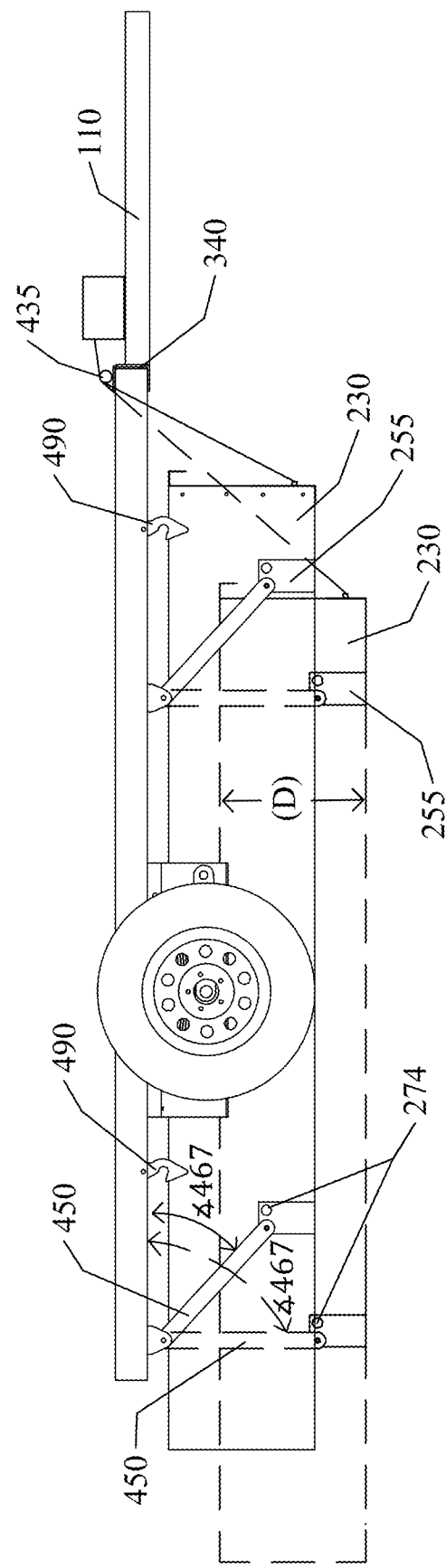

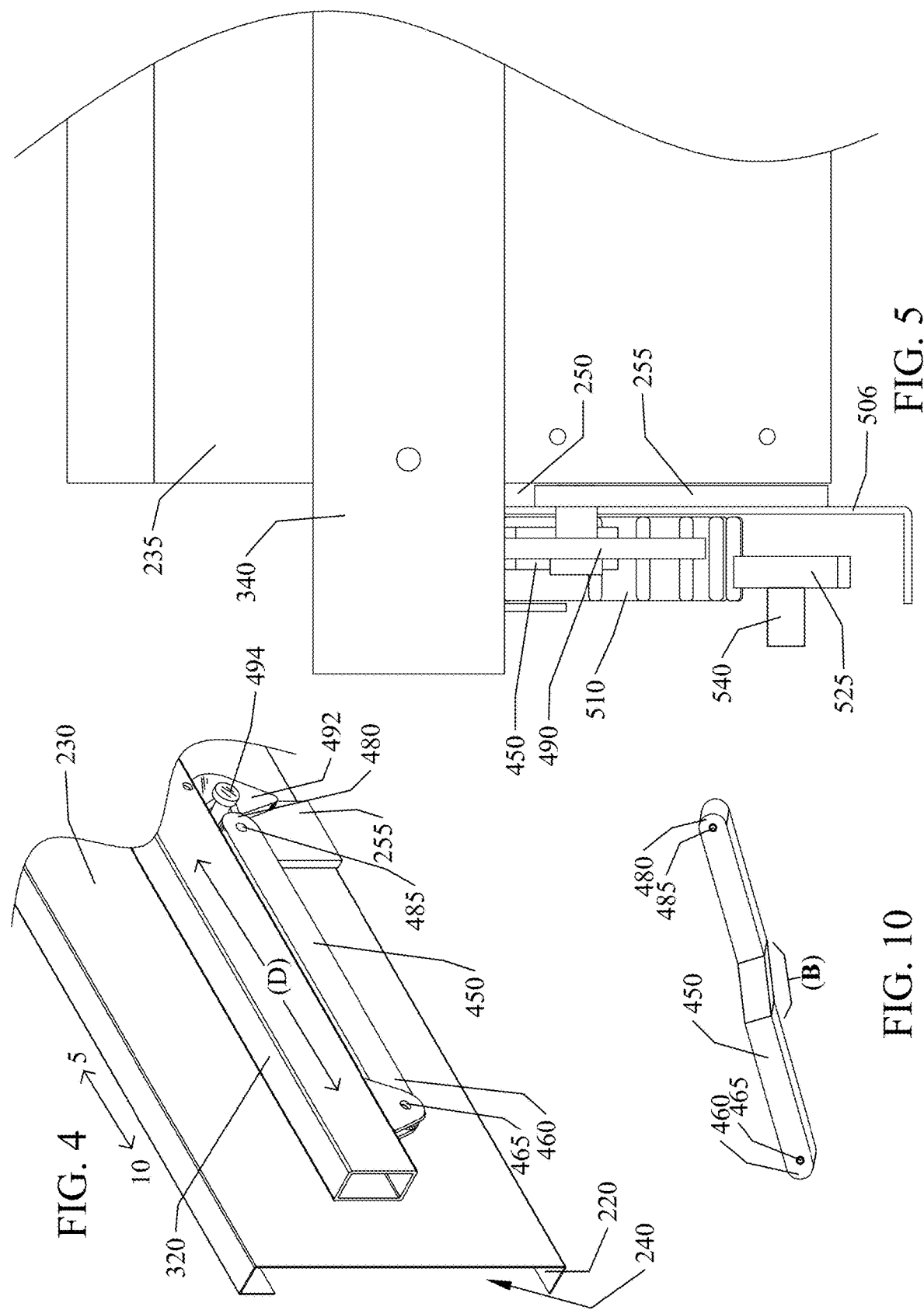

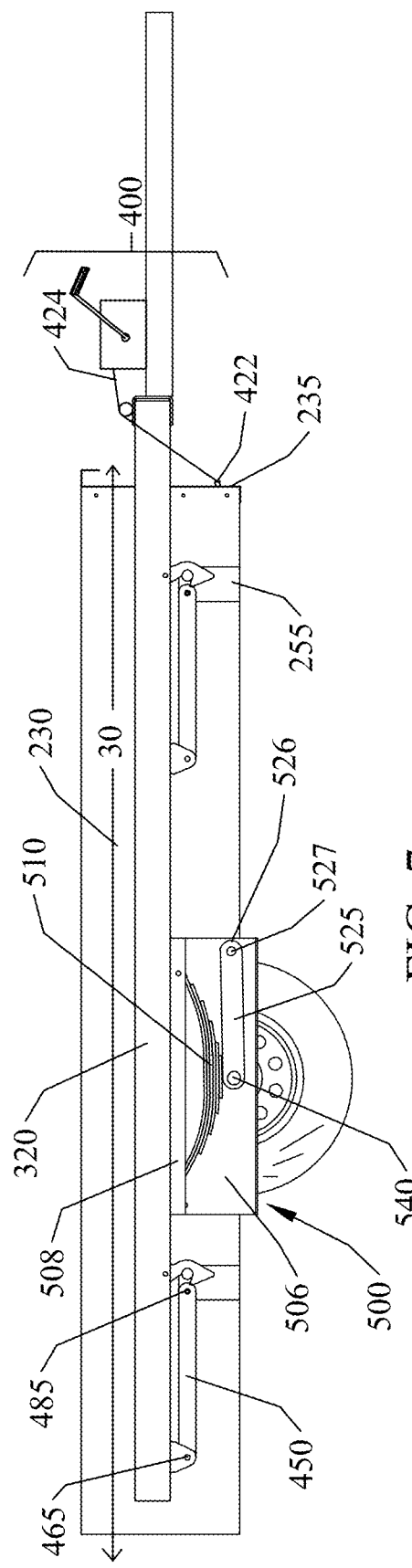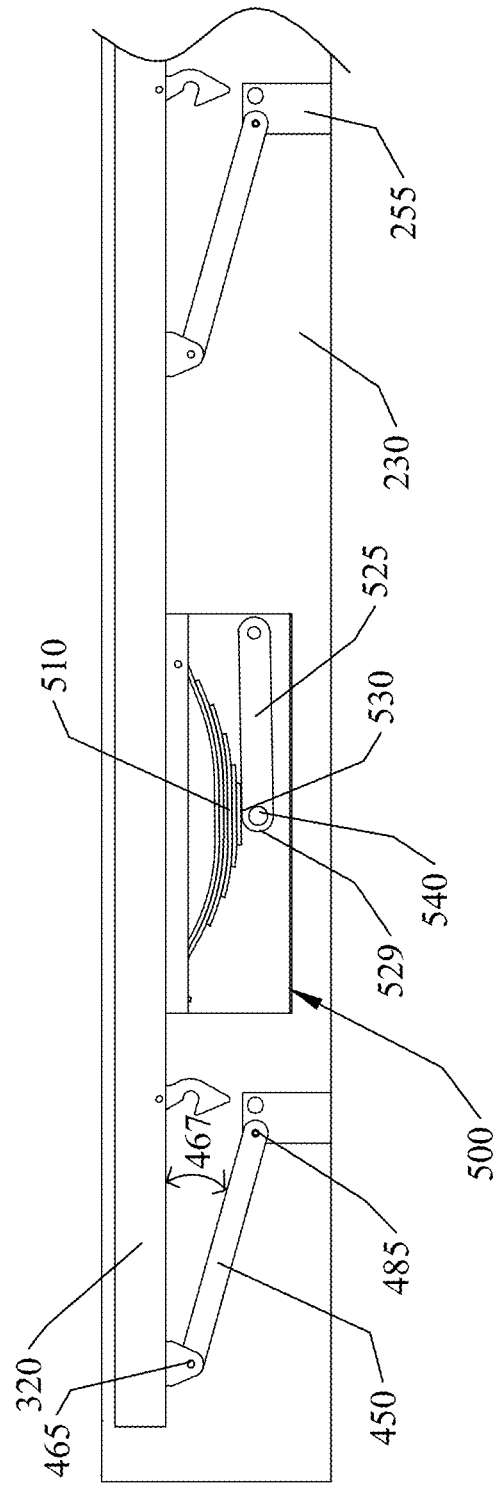
FIG. 7
FIG. 8

TRAILER SYSTEM AND METHODS OF USE

CROSS-REFERENCE TO RELATED APPLICATION

This application is a continuation of U.S. application Ser. No. 18/358,205, filed Jul. 25, 2023, which is hereby incorporated by reference herein in its entirety, including any figures, tables, or drawings.

BACKGROUND OF THE INVENTION

Trailers for towing that can tilt at the backend are used to more easily move a load onto a trailer floor. Trailers for towing are typically attached to a tow vehicle with a trailer tongue that is rotatably attached to a ball hitch or other rotatable connector. Usually, the back end of the trailer is lowered by tilting the entire trailer body over the wheel axles. There are several options for enabling this tilting: the tongue can rotate where it connects to the tow vehicle, the trailer body can tilt relative to the tongue, or the trailer can be removed from the two vehicle. When the backend of the trailer is tilted, the floor can be at an angle and used as a loading ramp. Depending on the length of the trailer, the angle of the tilted floor can provide a gradual ascent or a steep climb.

Tilting trailers can be beneficial when loading heavy pieces of equipment, such as industrial generators and pumps, fluid tanks, heavy duty vacuums, and the like. In some cases, it is not feasible to load large and/or heavy equipment onto a trailer with a tilted floor and some loads cannot be raised for placement on a trailer. There is a need for a trailer that can be lowered horizontally to ground level, where the trailer body is not angled or does not have an appreciable tilt. It would be further beneficial if the trailer could be adapted for direct attachment to a load. This could allow a load to be configured for towing without being transported on a trailer floor.

BRIEF SUMMARY

In accordance with the subject invention, the problem of lowering a towable trailer while maintaining a substantially horizontal orientation is solved by a trailer system comprising a trailer body that can swing to a lower or dropped position or a higher or raised position with the trailer body in a substantially horizontal orientation or horizontal alignment. A trailer system of the subject invention comprises a trailer body that can be raised and lowered on a trailer frame with a suspension apparatus. The suspension apparatus can include one or more suspension arms that comprise an upper end that can be rotatably attached to a trailer frame and a lower end that can be rotatably attached to a trailer body. The suspension arms allow the trailer body to swing forward and backward to raise and lower, respectively, the trailer body on the trailer frame.

The suspension apparatus can also include a hoist mechanism with a winch device operably connected to a flexible connector that is further attached to the trailer body. The winch device can raise and lower the trailer body with the flexible connector. When the flexible connector is under tension from the winch device, the trailer body can be pulled proximally and the suspension arms can guide the trailer body upwards as it swings upward between side arms of the trailer frame. Conversely, when tension is released on the flexible connector, the trailer body can swing to a lower or dropped position on the arms rotatably attached to the trailer frame. Advantageously, the suspension arms can control the swing motion and maintain the trailer body in a substantially horizontal position or orientation as the trailer body swings upward and downward. A load space in the trailer body can include a floor on which a load can be supported and when the trailer body is raised or lowered the floor maintains the substantially horizontal orientation. Alternatively, the load space of the trailer body can be open or without a floor and the sidewalls and/or or the front wall can be attached to a load. With either option, the orientation of the trailer body can remain substantially the same when raised or lowered allowing the load to be raised and towed with or without being supported on a trailer floor.

The trailer system can also have modular wheel suspensions that are capable of independent operation. The modular wheel suspensions can be operably attached to the trailer frame and can utilize stub axles that facilitate raising and lowing of the trailer body in the horizontal orientation. The stub axles can be operably attached to one end of a rocker arm and can support a wheel. The opposite end of the rocker arm can be rotatably attached to a housing that can also support a suspension mechanism for dampening shock and vibration from the motion of the wheel. The rocker arm can operably engage with the suspension mechanism.

The trailer frame can be on the outside of the trailer body. There can be a side arm on each side of the trailer frame and a brace that connects the side arms at the front, or proximal end, of the trailer frame. A tongue can be attached to the brace for connecting the trailer frame to a tow vehicle.

To use the trailer system, the tension on the flexible connector of the hoist mechanism can be released by the winch device, preferably in a controlled manner, which releases the trailer body to swing down and back, or distal to the trailer frame, on the suspension arms. As the trailer body swings, the suspension arms can support the trailer body in a substantially horizontal position. At ground level or when the suspension arms have reached a maximum extension, the trailer body can be in a substantially horizontal position, such that the sidewalls are in the same substantially horizontal position as in the raised position. If a floor is utilized with the trailer body, the floor can also be lowered in a substantially horizontal position. Thus, the entire trailer body can be at ground level in a substantially horizontal position. This can advantageously position the sidewalls and/or the front wall of the trailer body for attachment to the load, if the trailer body does not have a floor. Using the hoist mechanism, the trailer body can swing upwards horizontally, between the side arms of the trailer frame, until the suspension arms reach a minimum extension or swing radius. At this point, the trailer body and/or the load can be secured for towing.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. The drawings presented herein may not be drawn to scale and any reference to dimensions in the drawings or the following description are specific to the embodiments disclosed. Variations of these dimensions that will allow the subject invention to function for its intended purpose are considered to be within the scope of the subject invention. Thus, understanding that these drawings depict only typical embodiments of the invention and are not therefore to be considered as limiting in scope, the invention will be described and explained with additional specificity and detail through the use of the accompanying drawings in which:

FIG. 2 is a right side elevation view of an embodiment of a trailer system with a trailer frame supported a raised trailer body on suspension arms, according to the subject invention.

FIG. 3 is a right side elevation view of an embodiment of a trailer system showing a trailer body that has been lowered or dropped with a hoist within the trailer frame, according to the subject invention. The dashed lines show an embodiment of a trailer body with the suspension arms at a maximum swing radius ∡.

FIG. 4 is an enlarged sectional view of an embodiment of a trailer system showing a suspension arm and a securing apparatus. As shown here, the trailer body is in a raised position.

FIG. 5 is an enlarged sectional elevation view of a front right side of an embodiment of a trailer system showing a modular wheel suspension with the wheel removed to expose the stub axle.

FIG. 7 is a right side elevation view of an embodiment of a trailer system with a trailer frame supporting a raised trailer body, according to the subject invention. As shown here, the wheel has been removed from the right side modular wheel suspension.

FIG. 8 is an enlarged partial right side elevation view of the embodiment of a trailer system in FIG. 7, where the trailer body has been partially lowered or dropped within the trailer frame, according to the subject invention.

FIG. 10 shows an alternative embodiment of a suspension arm.

DETAILED DISCLOSURE

Figure 1:
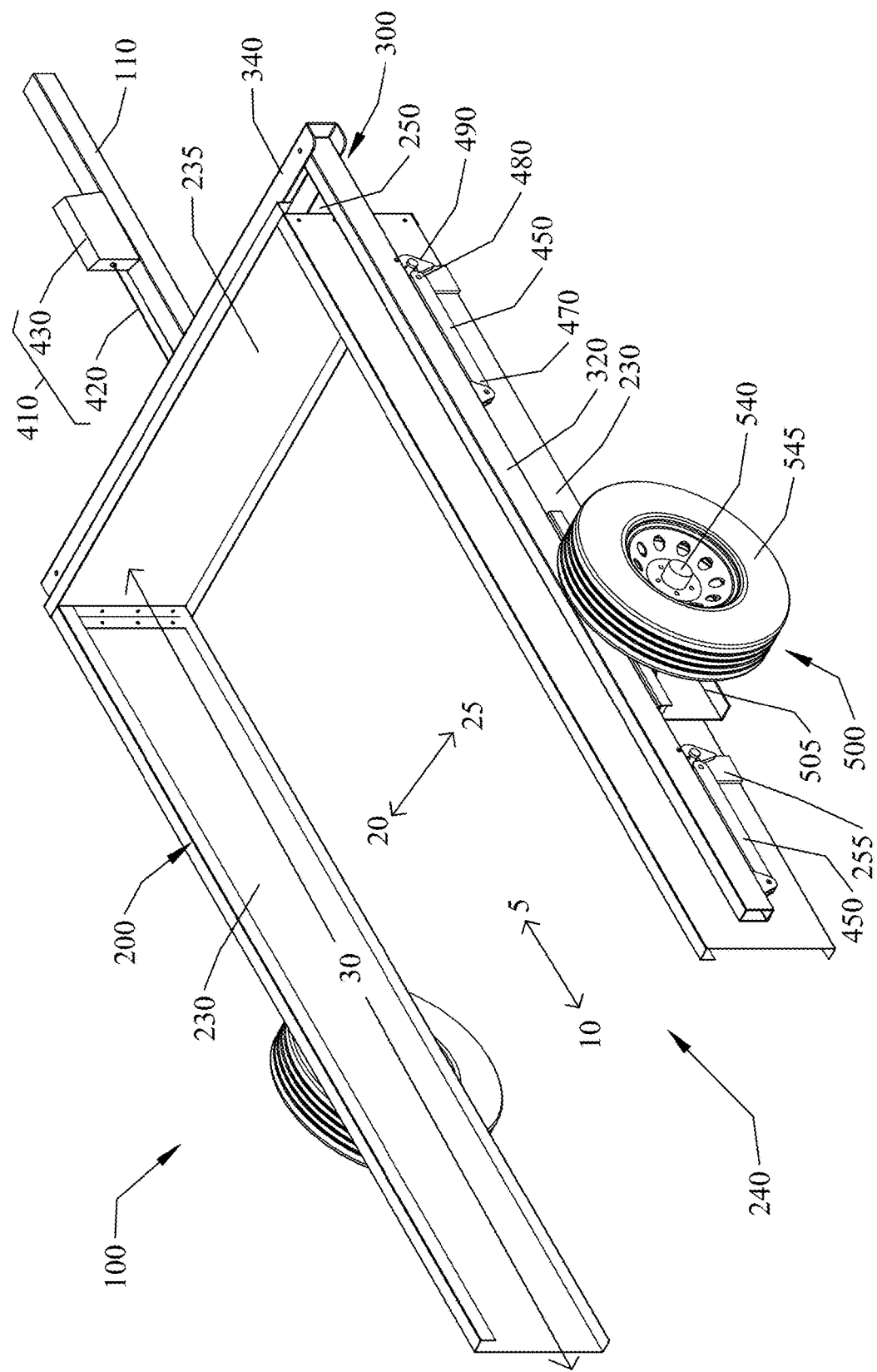
FIG. 1 is a rear perspective view of an embodiment of a trailer system with a trailer frame supporting a raised trailer body on suspension arms, according to the subject invention. The trailer body shown here does not have a floor.

The subject invention pertains to embodiments of a towable trailer system. More specifically, the subject invention provides one or more embodiments of a trailer system comprising a trailer body supported on a trailer frame. The trailer body can be lowered or dropped relative to the trailer frame for loading on a floor of the trailer or for attachment to a load, which can be subsequently raised to a height for towing.

The subject invention can be particularly useful for towing or hauling with a vehicle. As the ordinary artisan will be able to recognize, there are numerous other uses that would be applicable to the devices and methods of the subject invention. Thus, while the subject application describes, and many of the terms herein relate to, a use for towing and hauling, the subject invention can be utilized whenever and wherever it would be beneficial to move an load, with or without a vehicle, particularly when the load is not conducive to being placed on a traditional trailer bed.

In the description that follows, a number of terms are utilized. In order to provide a clear and consistent understanding of the specification and claims, the following definitions are provided.

As used herein, the term "substantially" refers to the complete or nearly complete extent or degree of an action, characteristic, property, state, structure, item, or result. For example, an object that is "substantially" in a given position including but not limited to vertical, horizontal, or adjacent to or aligned with another object, would mean that the object is either completely in that position or nearly completely in that position. The exact allowable degree of deviation from absolute completeness may in some cases depend on the specific context. However, generally speaking the nearness of completion will be so as to have the same overall result as if absolute and total completion were obtained.

As also used herein, the terms "about" or "approximately," as used herein, are defined as at least close to a given value or either end of a range as is necessary to cover manufacturing variances, equipment tolerances, and normal variances in material, as understood by those skilled in the art.

Further, terms indicating relative direction or orientation, including but not limited to "upper", "lower", "top", "bottom", "vertical", "horizontal", "outer", "inner", "front", "back", and the like, are intended to facilitate description of the present invention by indicating relative orientation or direction in usual use, and are not intended to limit the scope of the present invention in any way to such orientations or directions.

Also, as used herein, and unless otherwise specifically stated, the terms "operable communication," "operable connection," "operably connected," "cooperatively engaged," "operably attached" and grammatical variations thereof mean that the particular elements are connected in such a way that they cooperate to achieve their intended function or functions. The "connection" or "engagement" may be direct, or indirect, physical or remote.

The term "wheel" is used herein merely for literary convenience. As used herein, a wheel can include, but does not necessarily require, a tire, rim, stub axle, and any other components necessary to functionalize a wheel.

The term "ground level" as used herein refers to a surface or terrain on which a trailer system, according to the subject invention, can be supported. The term can also refer more specifically to a surface or terrain on which the trailer body can be supported when lowered or dropped within the trailer frame. In certain instances, ground level can also refer to a maximum swing radius of the suspension arms.

The transitional term "comprising," which is synonymous with "including," "having," or "containing," is inclusive or open-ended and does not exclude additional, unrecited elements or method steps. By contrast, the transitional phrase "consisting of" excludes any element, step, or component not specified in the claim. The transitional phrase "consisting essentially of" limits the scope of a claim to the specified materials or steps and those that do not materially affect the basic and novel characteristic(s) of the claimed invention. Use of the term "comprising" contemplates other embodiments that "consist" or "consist essentially of" the recited component(s).

Any reference in this specification to "one embodiment," "an embodiment," "example embodiment," "further embodiment," "alternative embodiment," "select embodiment," etc., is for literary convenience. The implication is that any particular feature, structure, or characteristic described in connection with such an embodiment is included in at least one embodiment of the invention. The appearance of such phrases in various places in the specification does not necessarily refer to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

Finally, reference is made throughout the application to the "proximal end" or "proximal direction" and "distal end" or "distal direction." As used herein, the proximal end or direction is that end nearest to or directed towards the trailer tongue or that end nearest or directed towards a tow vehicle. Conversely, the distal end is that end furthest from or directed away from the trailer tongue or the end towards which the trailer body can swing when lowered.

The present invention is more particularly described in the following examples that are intended to be illustrative only because numerous modifications and variations therein will be apparent to those skilled in the art. As used in the specification and in the claims, the singular for "a," "an" and "the" include plural referents unless the context clearly dictates otherwise.

It is further to be understood that the figures and descriptions of embodiments of the present invention have been simplified to illustrate elements that are relevant for a clear understanding of the invention, while eliminating, for purposes of clarity, other elements that may be well known. Those of ordinary skill in the art will recognize that other elements may be desirable and/or required in order to implement the present invention.

Reference will be made to the attached figures on which the same reference numerals are used throughout to indicate the same or similar components. With reference to the attached figures, which show certain embodiments of the subject invention, it can be seen in FIG. 1 that a trailer system 100 of the subject invention comprises a trailer body 200 with sidewalls 230. The trailer body can be positioned within a trailer frame 300 that has side arms 320 beside and on the outside of the sidewalls or on the opposite side as that of a load space 240 of the trailer body 200. The trailer body can be coupled to the trailer frame by a suspension apparatus 400 that can include one or more suspension arms 450 rotatably attached to both the sidewalls and the side arms and having a swing radius ∡ 467 that allows the trailer body to swing proximally and distally between the side arms, while maintaining a substantially horizontal orientation 30. A hoist mechanism 410 can be used to raise or lower the trailer body on the suspension arms. Finally, a modular wheel suspension 500 can be utilized to provide wheels 545 and a suspension mechanism 510 for towing the trailer system 100. Each of these general components can have one or more sub-components, which will be discussed in detail below.

A trailer system 100 of the subject invention provides a unique and advantageous alternative to conventional trailers towed with a vehicle. The trailer system can be used with any of a variety of loads, including loads that are supported on a trailer floor or other supporting surface. Thus, the trailer system can have a trailer body with a floor or other supporting surface on which a load can be supported, and towed. Alternatively, the trailer system can have a trailer body without a supporting floor or supporting surface, such that the trailer body can be attached, directly or indirectly, to the load to be towed. For the sake of clarity and brevity, the trailer system will be described herein with a trailer body that does not include a floor or other supporting surface. It will be understood by a person of skill in the art that reference herein to a "load" or grammatical variations thereof can include, but does not require, a floor or other supporting surface.

The trailer body 200 of the trailer system 100 can provide a structure for towing a load. The trailer body can comprise one or more sidewalls 230. Attached at or about the proximal end 5 of the sidewalls can be at least one front wall 235. In one embodiment, there is at least one sidewall on a left side 20 and at least one side wall on a right side 25 of the trailer body and at least one front wall attached to at or about the proximal ends of the sidewalls. In a further embodiment, the sidewalls and the front wall define a load space 240 therebetween, such as shown, for example, in FIGS. 1 and 6.

Figure 6:
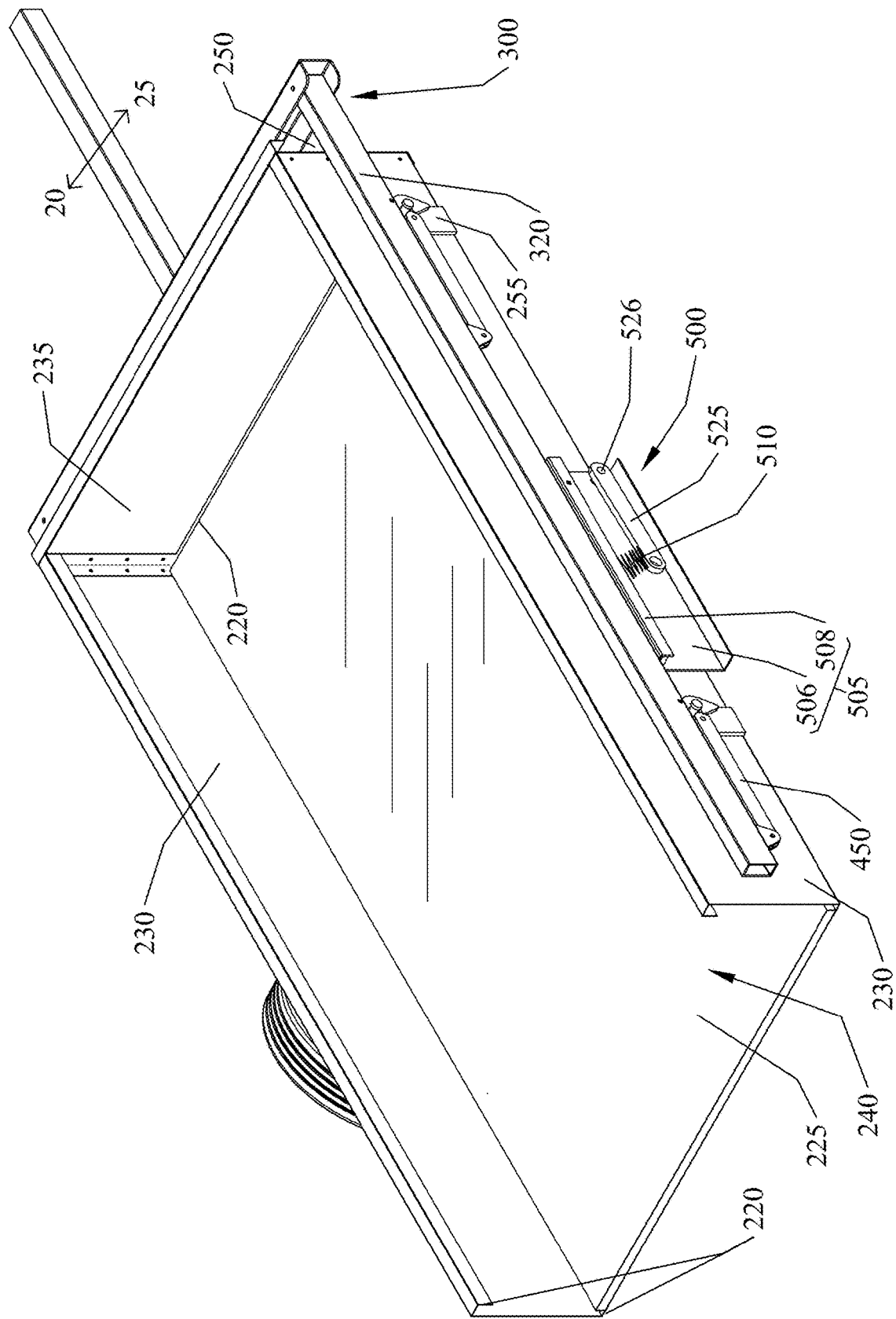
FIG. 6 is a rear perspective view of an embodiment of a trailer system with a trailer frame supporting a raised trailer body on suspension arms, according to the subject invention. As shown here, the trailer body includes a floor.

The front wall and sidewalls can form a rigid structure. Further, when the trailer body swings downward or drops to a lower position, the sidewalls can move simultaneously with the front wall. FIGS. 1 and 6 illustrate non-limiting examples of trailer bodies with parallel sidewalls that extend in a proximal 5 to distal 10 direction along the left 20 and right 25 sides of a trailer body 200 and the front wall 235 perpendicular to the proximal ends of the sidewalls. As shown, these components all have straight-sides, right angles, and flat surfaces. A person of skill in the art will recognize that the sidewalls and front walls can have other configurations.

The load space 240 can be an opening, space, or area between the sidewalls and front wall of a trailer body in which a load can be positioned for towing. In one embodiment, a load can be operably attached to at least one of a sidewall and the front wall. For example, large industrial equipment, such as generators, pumps, tanks, and other large and/or heavy loads can be placed in the load space and be permanently or removably attached to one or more of the sidewalls and front wall. In one embodiment, the trailer body can have one or more connecting structures 220, such as shown, by way of example, in FIGS. 4 and 6, which can be utilized to operably attach a load to the trailer body. For example, as shown in FIG. 6, a trailer body can have connecting structures on the sidewalls and the front wall that can be used to attach and support floor or other supporting structure.

The trailer body 200 can be positioned within a trailer frame 300. More specifically, a trailer frame can at least partially surround or "frame" the trailer body. In one embodiment, a trailer frame comprises at least one side arm 320 located beside and to the outside of a sidewall 230 of the trailer body 200. In other words, the side arms can be on the opposite side of the load space 240. As shown, for example, in FIGS. 4, 6, and 8, a sidearm can be arranged on the outside of the sidewalls, or opposite to the load space. In a further embodiment, the trailer frame comprises a brace 340 attached to the proximal end 5 of the at least one side arm. In a still further embodiment, the brace is proximal to the at least one front wall 235 of a trailer body 200. Stated another way, the brace can be on the outside of the front wall and opposite to the load space. In a specific embodiment, a trailer frame has a sidearm arranged on the outside of a sidewall on the left side 20 and a sidearm arranged on the outside of sidewall on the right side 25 of the trailer body. In a further specific embodiment, the trailer frame has a U-shape, wherein there is at least one brace attached to at or about the proximal end of the left and right side sidearms and proximal or to the outside of the front wall. Ideally, the trailer frame comprises a rigid structure capable of supporting a trailer body.

The trailer body 200 and the trailer frame 300 can be operably connected and the trailer body can be lowered and raised on the trailer frame, by the components of a suspension apparatus 400. The suspension apparatus can swing the trailer body on the trailer frame to raise and lower the trailer body for towing and loading, respectively. FIGS. 2, 3, and 7 show non-limiting examples of trailer bodies being lifted and lowered with suspension apparatuses. A suspension apparatus can include components that operably connect the trailer body to the trailer frame, as well as components that can swing the trailer body on the trailer frame to raise and lower the trailer body. Advantageously, the suspension apparatus can swing the trailer body so that it maintains a substantially horizontal position or horizontal orientation 30, as shown, for example, in FIGS. 1 and 7, during the entirety of the swing motion. Stated another way, the orientation of the trailer body remains substantially the same when raised and lowered or dropped, as shown, by way of further example, in FIG. 3.

A suspension apparatus 400 can comprise one or more elongated, substantially rigid suspension arms 450 that rotatably connect a sidewall 230 of the trailer body 200 to a side arm 320 of the trailer frame 300. FIG. 4 shows an enlarged view of an embodiment of a suspension arm. A suspension arm can beneficially constrain or guide the swing motion of the trailer body. A suspension arm can have rotation point 465 at or near to an upper end 460 that allows the suspension arm to rotate on the side arm of the trailer frame. For example, as shown in FIGS. 3 and 8, the rotation point can attach the upper end to a bottom side or underneath a sidearm, such that the suspension arm rotates under the sidearm. Other configurations are also possible. In one embodiment, the suspension arm has with a swing radius ∡ 467, relative to the side arm. In a further embodiment, the swing radius can be at least about 30°, 35°, 40°, 45°, 50°, 55°, 60°, 65°, 70°, 75°, 80°, 85°, 90°, 95°, 100°, and/or a swing radius between any two of the listed values. In one embodiment, the rotation point 465 at the upper end 460 is rotatably connected to a U-bracket on the side arm that allows substantially free rotation of the suspension arm on the bottom of a side arm 320.

Opposite to the upper end 460 of the suspension arm 450 is the lower end 480, as shown, for example, in FIG. 4. The suspension arm can also have a swing point 485 at or near the lower end, where the suspension arm can be rotatably attached, directly or indirectly, to the trailer body 200, such as, for example, to the sidewall 230. The swing point can be rotatably connected by any means known to those skilled in the art. FIG. 4 shows an example of a swing point that is rotatably connected at the swing point with a pin. Any of a variety of coupling devices can be utilized such as, by way of non-limiting examples, brackets, dowels, pins, slides, bolts, and other rotatable or slidable couplings known in the art.

As discussed above, a side arm 320 of a trailer frame 300 can be located on the outside of a sidewall of the trailer body. This configuration can provide a gap 250, for example, as shown in FIGS. 5 and 6, between the side arm and the sidewall that can be beneficial when the trailer body swings on the trailer frame. The gap can inhibit contact or interference between the trailer body and the trailer frame when the trailer body swings upwards or downwards. As also discussed above, a suspension arm 450 can be rotatably attached at a rotation point 465 on the side arm 320 and at a swing point 485 on the sidewall 230. During towing, the suspension arm can be raised so as to be at least close to or in contact with the sidearm. To facilitate the positioning against the sidearm 320 and inhibit bending, torquing, or other misalignment of the suspension arm, which can occur because of the gap, the suspension arm can be configured with a turn or bend (B) that positions at least a portion of the lower end 480 nearer to the side wall to accommodate for the gap 250 and inhibit torquing or other tension on the suspension arm 450. FIG. 10 shows a non-limiting example of a suspension arm with a bend that positions the lower end nearer to the sidewall. The swing point at the lower end 480 can also be operably attached to the sidewall. The bend can also inhibit lateral motion of the trailer body when swinging on the suspension arms 450.

Alternatively, the side arm can be substantially straight and a spacer 255 can be utilized to compensate for the gap and stabilize the trailer body when the suspension arm is raised. A spacer can be a raised area or platform on the sidewall. Ideally, the spacer does not inhibit the swing motion of the trailer body on the suspension arms. In one embodiment a spacer is attached to or otherwise arranged or incorporated with the sidewall 230 of the trailer body to create a raised area or platform with a height that can substantially close or fill the gap between the sidewall and the side arm when the trailer body is raised. In one embodiment, shown in FIG. 5, the spacer is arranged near the bottom end of the sidewall. When the sidewall swings downward or is dropped the spacer dislodges or is removed from a position the gap 250 between the side wall and the side arm. When the trailer body is raised the spacer can again tuck under or lodge under the side arm, closing all or most of the gap therebetween. This can beneficially inhibit sideways motion of the trailer body within the trailer frame. Thus, the spacer can stabilize the suspension arm as well as the trailer body on the trailer frame. In a further embodiment, the swing point 485, where the suspension arm rotatably connects to the trailer body, can be arranged on the spacer, as shown, for example, in FIGS. 4 and 7.

The distance (D) between the rotation point 465 and the swing point 485 of the suspension arm can be a factor in determining the maximum extent to which the trailer body can be lowered or dropped relative to the side arm of the trailer frame. The distance (D) can allow the trailer body to swing a ground level on which the trailer system 100 is supported. Alternatively, the distance (D) can allow the trailer body to swing to a ground level that is below that on which the trailer frame is supported. In other words, the distance (D) could allow the trailer body to swing to a ground level that is below that of the wheel or other support for the trailer frame, as shown, for example, in FIG. 3. In one embodiment, the distance (D) can determine a swing radius ∡ 467 of the suspension arm. If the rotation point and the swing point are freely rotating, the swing radius can be at least about 90° and the suspension arm can be substantially vertical to the trailer frame, an example of which is shown by the dashed line image in FIG. 3. Advantageously, as mentioned above, the suspension arms can have a swing radius ∡ 467 that also allows the trailer body to swing down and more distal to the trailer frame, such that the swing radius is larger than about 90°, which is not shown in the figures, but would be understood by a person of skill the art.

The suspension apparatus 400 can also include a hoist mechanism 410 to control lowering and raising of the trailer body 200, which simultaneously controls the swing radius ∡ 467. A hoist mechanism can include a flexible connector 420 that attaches to the trailer body and to a winch device 430 to swing the trailer body into the trailer frame. As used herein, winch device refers to any of a variety of devices that can apply tension by winding, turning, pulling or otherwise shortening the length of the flexible connector 420 between the trailer body and the winch device. A winch device can be operated manually, mechanically, electrically, pneumatically, hydraulically, by other methods known in the art, or some combination thereof to controllable shorten, such as, for example, by winding, or controllably release, such as by unwinding, the flexible connector. A flexible connector can be, but is not limited to, rope, chain, cord, wire, cable, fiber, or other type of at least partially flexible material. Preferably, the flexible connector comprises a material having a minimal, or at least acceptable, elasticity, as can be determined by a person of skill in the art. In one embodiment, the hoist mechanism comprises a winding device. In more specific embodiments, hoist mechanism comprises an electric winch. A person of skill in the art would be able to determine an appropriate winch device and flexible connector for raising and lowering a trailer body. Thus, variations in the configuration of the hoist mechanism utilized with embodiments of the subject invention, which provide the same functionality, in substantially the way as described herein, with substantially the same desired results, are within the scope of this invention.

Figure 9:
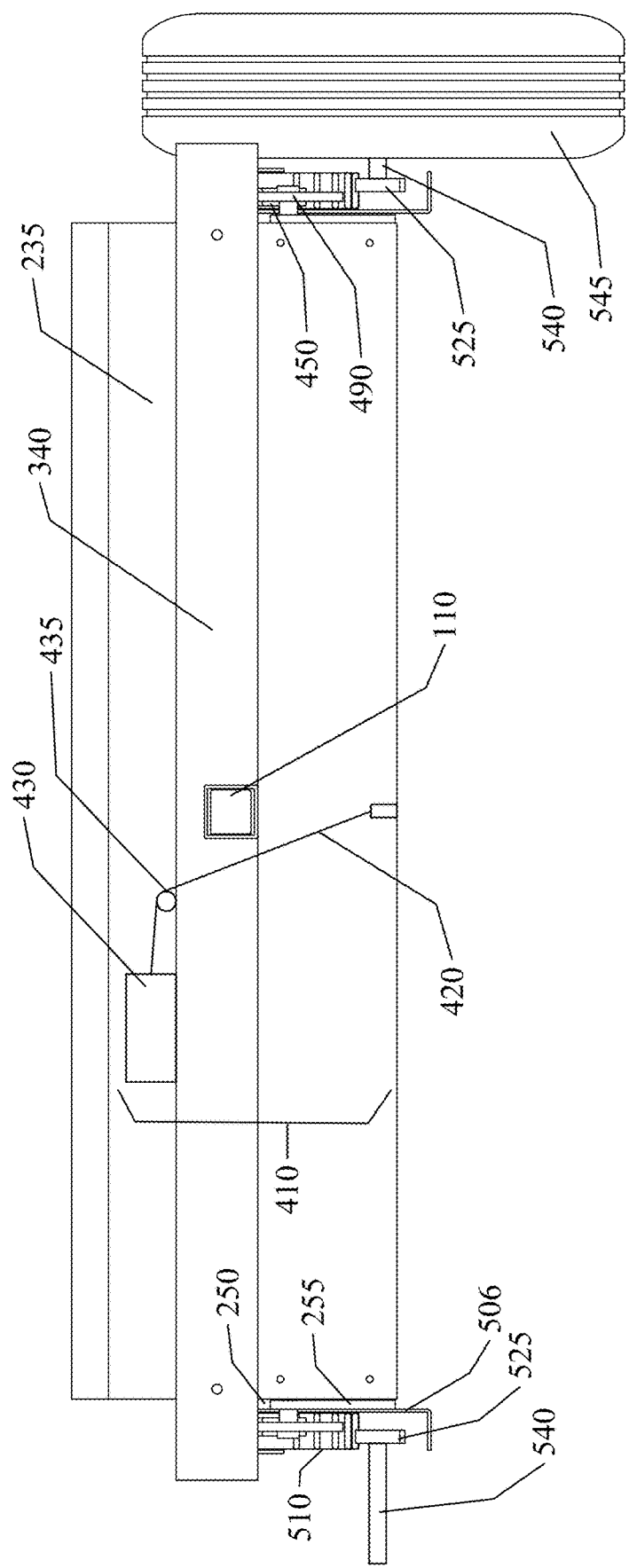
FIG. 9 is a front elevation view of an embodiment of a trailer, with the wheel removed from the right side modular wheel suspension to show the stub axle.

In one embodiment, a flexible connector 420 is fixedly attached by an anchor end 422 to a front wall 235 of the trailer body 200. In further embodiment, an opposite or winding end 424 of the flexible connector is operably engaged with the winch device 430. The winch device can shorten or lengthen the flexible connector between the trailer body and the winch device, to raise or lower the trailer body, respectively. The winch device can be arranged on the trailer frame 300. FIGS. 1, 2, and 3 show examples of a winch device arranged on or near the trailer tongue 110. FIG. 9 shows an alternative example of a winch device arranged on the brace 340 of the trailer frame 300. Where necessary, one or more guides 435, such as, for example, blocks, eyelets, or pulleys, can be strategically placed to direct the path of the flexible connector to and from the winch device. As shown in FIGS. 3 and 8, tension on the flexible connector can be released by the winch device allowing the flexible connector to lengthen so the weight of the trailer body causes it to drop and the suspension arms 450 to guide the trailer body downward and distally between the side arms 320 of the trailer frame.

When the winch device 430 applies tension to shorten the flexible connector and raise the trailer body to a position within the trailer frame for towing, the suspension arms can rotate upward and be close to or in contact with the side arms 320 of the trailer frame. In one embodiment, the suspension arms can be rotated until substantially parallel to the side arms, examples of which can be seen in FIGS. 2 and 7. The winch device can hold tension on the flexible connector to maintain the trailer body in the upward position for towing. Alternatively, or in addition, the trailer body can be secured with a securing mechanism 490 that stabilizes the trailer body in the towable position on the trailer frame. In one embodiment the securing mechanism operably connects the trailer body temporarily to the trailer frame. FIGS. 3, 4, and 8 show examples of a securing mechanism comprising a swing arm latch 492 with a latch pin 494. In one embodiment, the latch pin is arranged on a spacer 255, to accommodate for the gap 250 between the side arm and the sidewall. The ability to select appropriate, alternative securing mechanisms 490 and the appropriate placement on a trailer body or trailer frame is within the capability of one of ordinary skill in the art and will not be described in further detail here.

Conventional trailers typically employ cross-body axles that connect the wheels on each side of the trailer body. When configured to tilt, the trailer body if usually tilted over the one or more cross-body axles, to lower the back end, placing the trailer body at an angle, so the trailer floor can be used as a ramp. As discussed above, embodiments of the subject invention utilize an alternative arrangement wherein the trailer body can be lowered horizontally to ground level or other desired level relative to a trailer frame. This capability is facilitated by a modular wheel suspension 500 that advantageously does not utilize a cross-body axle.

A modular wheel suspension 500 can comprise: a housing 505, a suspension mechanism 510, a rocker arm 525, and a stub axle 540. The stub axle can be used to support a wheel. Alternatively, the stub axle can used with other types of devices that can support the trailer frame at a desirable height above ground level. The modular wheel suspension can be operably attached to the trailer frame 300 and can support the trailer frame at a predetermined height that allows the trailer body 200 to be raised and lowered, as discussed.

The components of a modular wheel suspension 500 can be contained, enclosed, arranged, or otherwise supported in a housing 505. The housing can be operably arranged on or attached to a sidearm 320 of the trailer frame 300, such that the components of the modular wheel suspension are directed outwards or away from the trailer body, making them accessible from a side of the trailer system. In other words, a wheel of the modular wheel suspension can be furthest away from each side of the trailer body, as shown, for example, in FIGS. 1 and 9.

The housing 505 of a modular wheel suspension can comprise a panel 506 and a plate 508. In one embodiment, the panel and plate are approximately at a right angle to one another. The plate can be on or attached to the side arm 320, so the panel is nearer to the trailer body 200. By way of a non-limiting example, as shown in FIGS. 6 and 9, the plate can be attached to a bottom side of the side arm of the trailer frame, so that the gap 250, discussed above, is between the panel and the sidewall 230 of the trailer. In an alternative embodiment, the bottom side of the trailer arm can be utilized as a plate, such that the panel is fixedly attached to the side arm. The modular wheel suspension system can support the trailer frame 300, and preferably does not interfere with the trailer body.

The housing can support a suspension mechanism 510 for dampening motion of the wheel during towing. In one embodiment, the suspension mechanism is supported on and extends from the plate 508 of the housing 505. It can be beneficial, though not required, to use a passive suspension mechanism, in keeping with the modularity of embodiments of the modular wheel suspension of the subject invention. There are any of a variety of suspension mechanisms, passive and otherwise, which can be utilized with embodiments of the subject invention, including, but not limited to, bump stops, helical springs, pneumatic shocks, hydraulic shocks, torsion shocks, leaf springs, other types of suspension mechanisms, and combinations thereof, known to those with skill in the art. FIG. 6 illustrates a non-limiting example of a modular wheel suspension 500 that employs a helical spring for a suspension mechanism suspended from the plate 508. FIGS. 7-9 illustrate non-limiting examples of modular wheel suspensions 500 that employ a leaf spring for a suspension mechanism that is suspended from the plate 508.

To place the wheel in a position that allows the suspension mechanism to dampen shock and other motion from the wheel, particularly, but not limited to, when towing, a modular suspension system can comprise a rocker arm 525. A rocker arm can support the wheel of the modular suspension mechanism. The rocker am can further respond to motion of the wheel, which can be translated to the suspension mechanism. In one embodiment, the rocker arm has a pivot end 526 that rotates or pivots around a pivot point 527 and that can be attached to the panel 506 of the housing. In a further embodiment, opposite to the pivot end is a suspension mount end 529 that can cooperatively engage, directly or indirectly, with the suspension mechanism 510. The suspension mount end can make contact with the suspension mechanism. In a specific embodiment, shown in FIGS. 5-9, the rocker arm is a substantially straight rod comprising an upper surface or suspension mount 530 at the suspension mount end 529 that abuts or otherwise operably makes contact with a leaf spring suspension mechanism.

A stub axle 540 can be operably connected to the rocker arm. Stub axles are shortened axles typically utilized to support a wheel 545. Stub axles are known in the art and the ability to select an appropriate stub axle for a trailer system 100 is within the capability of a person having ordinary skill in the art. In one embodiment, the stub axle is operable connected at or near to the suspension mount end 529 of the rocker arm, such that, motion, such, as for example, non-horizontal motion, from the wheel can be translated through the stub axle to the suspension mount end to be dampened, muffled, or otherwise controlled by the suspension mechanism.

Trailers towed behind vehicle are probably one of the most common ways to move a load over the road or other terrain. The problem is getting the load on the trailer. The subject invention provides a unique and advantageous solution in the form of a trailer system that can be used with a floor to tow a load or can be directly attached to a load. A further advantage is the ability to lower the trailer body to a more convenient level placing a load on the trailer or for attaching the trailer body, so the attached load can be raised for towing.

All patents, patent applications, provisional applications, and other publications referred to or cited herein are incorporated by reference in their entirety, including all figures and tables, to the extent they are not inconsistent with the explicit teachings of this specification. Additionally, the entire contents of the references cited within the references cited herein are also entirely incorporated by reference.

The examples and embodiments described herein are for illustrative purposes only and that various modifications or changes in light thereof will be suggested to persons skilled in the art and are to be included within the spirit and purview of this application.

The invention claimed is:

1. A trailer comprising:
   a trailer frame comprising a side arm;
   a trailer body comprising a sidewall defining a load space, wherein the side arm is beside the sidewall and opposite to the load space;
   a suspension apparatus for adjusting the height of the trailer body, between a raised position and a lowered position relative to the trailer frame, the suspension apparatus comprising:
      a suspension arm having a first end rotatably attached to the side arm at a rotation point and a second end;
      a spacer arranged between the sidewall and the second end of the suspension arm, wherein the second end is rotatably or slidably attached to the spacer at a swing point;
   such that the height of the trailer body is adjustable on the trailer frame by swinging the trailer body on the suspension arm.

2. The trailer according to claim 1, wherein the spacer is disposed such that, when the height of the trailer body is adjusted to a raised position on the trailer frame, the spacer is between the sidewall and the side arm.

3. The trailer according to claim 1, wherein the side arm and the suspension arm have a swing radius ($\measuredangle$) therebetween that is at least about 30°, 35°, 40°, 45°, 50°, 55°, 60°, 65°, 70°, 75°, 80°, 85°, 90°, 95°, or 100°.

4. The trailer according to claim 3, wherein the swing radius of the suspension arm differs from a swing radius of at least one other suspension arm arranged on the trailer, when the height of the trailer body is adjusted on the trailer frame.

5. The trailer according to claim 1, further comprising a securing mechanism configured to secure the trailer body to the trailer frame, the securing mechanism comprising:
   a first component arranged on at least one of the spacer and the sidewall; and
   a complementary second component arranged on the side arm of the trailer frame, such that, when the height of the trailer body is adjusted to a raised position, the first component is operably engageable with the second component to secure the raised trailer body to the trailer frame.

6. The trailer according to claim 1, further comprising a hoist mechanism operably connected to the trailer body.

7. A method for adjusting the height of a trailer body, the method comprising:
   obtaining a trailer according to claim 1; and
   utilizing the suspension system to adjust the height of the trailer body by swinging the sidewall, relative to the side arm, on the suspension arm of the suspension system.

8. The method according to claim 7, wherein the trailer further comprises a hoist mechanism operably connected to the trailer body, and the method further comprises utilizing the hoist mechanism to adjust the height of the trailer body with the suspension system.

9. The method according to claim 7, wherein the trailer further comprises a securing mechanism that comprises:
   a first component arranged on at least one of the spacer and the sidewall of the trailer body; and
   a complementary second component arranged on the side arm of the trailer frame, wherein the method further comprises:
   adjusting the height of the trailer body to a raised position, and
   utilizing the securing mechanism to secure the trailer body to the trailer frame by engaging the first component with the second component.

10. A trailer comprising:
   a trailer frame comprising a side arm;
   a trailer body comprising a sidewall that defines a load space, wherein the side arm is beside the sidewall and opposite to the load space;
   a suspension apparatus for adjusting the height of the trailer body between a raised position and a lowered position relative to the trailer frame, the suspension apparatus comprising:
      a suspension arm having a first end rotatably attached to the side arm at a rotation point and a second end rotatably attached to the sidewall at a swing point, wherein the suspension arm comprises a bend, such that the second end of the suspension arm is closer to the sidewall than is the first end of the suspension arm.

11. The trailer according to claim 10, wherein the side arm and the suspension arm have a swing radius ($\measuredangle$) therebetween that is at least about 30°, 35°, 40°, 45°, 50°, 55°, 60°, 65°, 70°, 75°, 80°, 85°, 90°, 95°, or 100°.

12. The trailer according to claim 10, wherein the swing radius of the suspension arm differs from a swing radius of at least one other suspension arm arranged on the trailer, when the height of the trailer body is adjusted on the trailer frame.

13. The trailer according to claim 10, further comprising a hoist mechanism operably connected to the trailer body.

14. A method for adjusting the height of a trailer body on a trailer frame, the method comprising:
   obtaining a trailer according to claim 9; and
   utilizing the suspension system to adjust the height of the trailer body by raising or lowering the sidewall, relative to the side arm, such that the trailer body swings on the suspension arm of the suspension apparatus.

15. The method according to claim 14, wherein the trailer further comprises a hoist mechanism operably connected to the trailer body, and the method further comprises utilizing the hoist mechanism to adjust the height of the trailer body with the suspension system.

16. The method according to claim 14, wherein the trailer further comprises a securing mechanism that comprises:
   a first component arranged on the sidewall of the trailer body; and
   a complementary second component arranged on the side arm of the trailer frame, wherein the method further comprises,
   adjusting the height of the trailer body to a raised position, and
   utilizing the securing mechanism to secure the trailer body to the trailer frame by engaging the first component with the second component.

* * * * *